Patented July 31, 1945

2,380,905

UNITED STATES PATENT OFFICE 2,380,905

POLYMERIZATION OF BUTADIENE-1,3 HYDROCARBONS

William D. Stewart, Akron, Ohio, assignor to The B. F. Goodrich Company, New York, N. Y., a corporation of New York No Drawing. Application April 28, 1942, Serial No. 440,852

13 Claims. (Cl. 260—84.5)

This invention relates to the polymerization in aqueous emulsion of butadiene-1,3 hydrocarbons either alone, in admixture with each other or with other unsaturated compounds copolymerizable therewith. The principal objects of the invention are to provide a method for decreasing the time required to effect such polymerizations and, at the same time, to provide a method for improving the properties of the polymers obtained.

I have discovered that these and other objects may be accomplished by carrying out the polymerization of butadiene-1,3 hydrocarbons in aqueous emulsion in the presence of a sulfur-containing organic compound, which, for the purposes of this invention, may be defined as an aliphatic organic compound which contains less than twelve carbon atoms and at least one but not more than two divalent sulfur atoms at least one of which is connected to a carbon atom in an open chain aliphatic radical containing at least one hydrophilic group. By the expression "open chain aliphatic radical containing at least one hydrophilic group" is meant just what the expression implies, that is, a radical of an open chain aliphatic compound which is substantially more water soluble than an unsubstituted aliphatic hydrocarbon by reason of the fact that it contains one or more hydrophilic groups, or groups which impart water solubility to a compound, such as, for example, hydroxy, amino, carboxy, thiol, carbonyl, amide, sulfonic acid groups and the like. Whether or not any given radical contains a hydrophilic group may readily be ascertained by comparing the water solubility of the compound formed by adding a hydrogen atom to the radical with the water solubility of the corresponding unsubstituted hydrocarbon. For example, the hydroxy-ethyl radical obviously contains a hydrophilic group since ethyl alcohol is water soluble, whereas ethane is water insoluble. On the other hand, the chloro-ethyl radical obviously does not contain a hydrophilic group because ethyl chloride is substantially as water insoluble as ethane itself.

The sulfur-containing compounds in the above defined class are principally of three types, namely:

(1) Compounds containing less than 12 carbon atoms and at least one but not more than two divalent sulfur atoms present in a thiol, —SH, group which is linked to a carbon atom in an open chain aliphatic radical containing at least one hydrophilic group. Typical examples of compounds of this type are:

Thioglycollic acid (thiol-acetic acid)

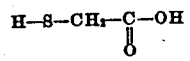

Thio-lactic acid (alpha-thiol propionic acid)

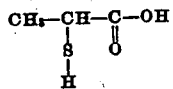

Alpha-thiol butyric acid

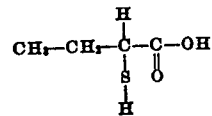

Cysteine (beta-thiol alpha-amino propionic acid)

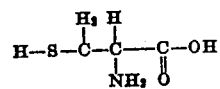

Glutathione (glutamyl cysteinyl glycine)

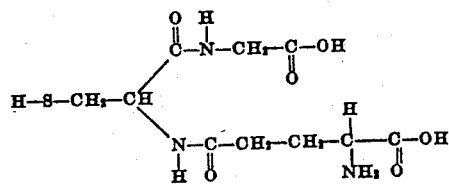

Beta-mercapto ethanol (beta-thiol ethanol)

H—S—CH₂—CH₂—O—H 1,2-ethane-dithiol (dithioglycol)

H—S—CH₂—CH₂—S—H 2,2-dithio diglycol (2,2-dithiol-ethyl ether)

H—S—CH₂—CH₂—O—CH₂—CH₂—S—H (2) Compounds containing less than 12 carbon atoms and at least one but not more than two divalent sulfur atoms each of which is present in a sulfide, —S—, group which is linked by at least one of its valences to a carbon atom in an aliphatic radical containing at least one hydrophilic group. Typical examples of compounds of this type are:

2,2'-thio di-ethanol

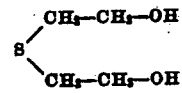

2,2'-diamino diethyl sulfide

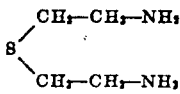

Methyl beta-amino-ethyl sulfide

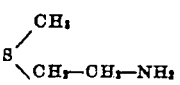

Ethyl beta-hydroxy-ethyl sulfide

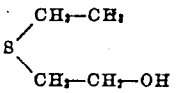

Methionine (alpha-amino-gamma-methylthiol-n-butyric acid)

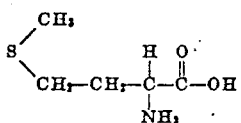

Diethyl-dithio-sulfo-succinate

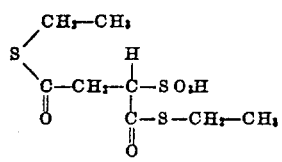

Dextrose ethyl mercaptal

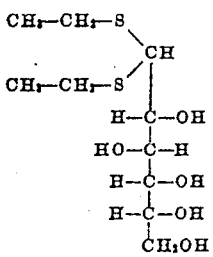

(3) Componds containing less than 12 carbon atoms and two divalent sulfur atoms present in a disulfide, —S—S—, group which is linked by each of its disconnected valences to a carbon atom in an aliphatic radical containing at least one hydrophilic group. Typical examples of compounds of this type are:

Di-thio-di-glycollic acid

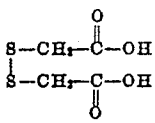

Cystine

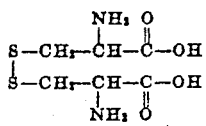

Di-beta-hydroxy-ethyl disulfide

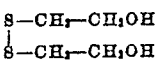

Di-beta-amino-ethyl disulfide

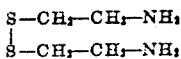

In the practice of this invention butadiene-1,3 hydrocarbons or mixtures of such hydrocarbons with other monomers copolymerizable therewith are polymerized in the form of an aqueous emulsion in the presence of a small amount of a sulfur-containing compound of the character described above, preferably one of the sulfur-containing compounds specifically mentioned above. The emulsion is conveniently prepared by emulsifying the monomers in water with the aid of an emulsifying agent, and the polymerization is usually effected by agitating the emulsion at a temperature of about 20 to 100° C. In addition to the sulfur-containing compounds of this invention, it is also desirable that the emulsion contain one or more other substances which favorably affect the polymerization such as polymerization initiators, polymerization modifiers and the like. The polymerization products are obtained in the form of latex-like dispersions which may be coagulated in the usual way to yield the solid polymers.

The method of this invention may be applied to the polymerization in aqueous emulsion of any of the butadiene-1,3 hydrocarbons, by which is meant butadiene-1,3, which is ordinary butadiene, and its hydrocarbon homologs which polymerize in essentially the same manner such as isoprene, 2,3-dimethyl butadiene-1,3, piperylene and the like. Mixtures of such hydrocarbons with one another or with other monomers which are copolymerizable therewith in aqueous emulsion to form linear copolymers may also be used. Monomers copolymerizable with butadiene hydrocarbons include aryl olefins such as styrene, p-chloro styrene, p-methoxy styrene, vinyl naphthalene and the like; acrylic and substituted acrylic acids and their esters, nitriles and amides such as acrylic acid, methyl acrylate, ethyl acrylate, methyl alpha-chloro acrylate, methyl methacrylate, methyl ethacrylate, ethyl methacrylate, acrylonitrile, methacrylonitrile, methacrylamide and the like; methyl vinyl ketone, methyl isopropenyl ketone, vinylidene chloride, vinyl furane, diethyl fumarate and other unsaturated hydrocarbons, esters, ethers, nitriles, etc. All these monomers, in general, contain the characteristic structure

where at least two of the disconnected valences are attached to hydrogen and at least one is connected to an electro-negative group, that is, a group which substantially increases the polar character of the molecule. It is preferable, in this invention, that these monomers when employed in mixtures with butadiene-1,3 hydrocarbons, be present in minor proportions by weight since monomer mixtures containing greater amounts of butadiene-1,3 hydrocarbons than of other monomers yield synthetic rubbery materials on polymerization. However, the invention is applicable to any mixture of a butadiene-1,3 hydrocarbon with another monomer copolymerizable therewith, which may be copolymerized in aqueous emulsion.

The preferred methods of practicing this invention and the improved results obtained when the sulfur-containing compounds of this invention are present in the emulsion polymerization of butadiene-1,3 hydrocarbons will be shown by the following specific examples which illustrate the invention as applied to the copolymerization of butadiene and acrylonitrile, but which are not intended to limit the invention in any respect.

*Example 1*

A mixture of 55 parts of butadiene and 45 parts of acrylonitrile is emulsified in 250 parts of a 2% aqueous solution of myristic acid which is 85% converted into soap by neutralization with sodium hydroxide. 10 parts of a 3½% solution of hydrogen peroxide as a polymerization initiator, and 1 part of cystine are added to the emulsion and the emulsion is agitated at 30° C. After 40 hours a latex-like emulsion is formed which, upon coagulation, produces a 100% yield of a rubbery copolymer of butadiene and acrylonitrile. The copolymer is plastic and easily milled and, in these respects, resembles unvulcanized natural rubber. It is 74% soluble in benzene. When compounded and vulcanized in a standard test recipe it yields vulcanizates having a tensile strength of 5600 lbs./sq. in. and a 730% elongation. A similar polymerization in which cystine was not present in the emulsion during the polymerization required 45 hours to produce a 90% yield and the product was not nearly so plastic and easily milled, more nearly resembling vulcanized natural rubber in these respects. It was only 24% soluble in benzene and yielded vulcanizates which did not possess as high a tensile strength and elongation as the vulcanizates obtained from the product of this example.

Example 2

Example 1 is repeated using, instead of cystine, 0.5 part of beta-mercapto ethanol. The polymerization is completed after only 31 hours at 30° C., and a rubbery copolymer similar to that obtained in Example 1 is the product.

Example 3

The procedure of Example 1 is again repeated except that 0.5 part of glutathione is substituted for the cystine of Example 1. A 94% yield of a rubbery copolymer of butadiene and acrylonitrile which is plastic and easily milled is obtained after a polymerization time of 31 hours at 30° C.

Example 4

A mixture of 55 parts of butadiene and 45 parts of acrylonitrile is emulsified in 250 parts of a 2% aqueous soap solution and the resulting emulsion is polymerized at 30° C. after the addition of 0.35 part of hydrogen peroxide and 0.5 part of 2,2'-diamino diethyl sulfide.

After 31 hours, the emulsion is polymerized to a latex from which, by coagulation, a 90% yield of a plastic coherent rubbery copolymer is obtained. Without the presence of the sulfide, the polymerization requires 55 hours to produce a 90% yield and the product is tough, non-plastic and difficult to mill.

The above examples show that the presence of the sulfur-containing compounds of this invention speeds up the polymerization reaction and, at the same time, produces a rubbery polymer which is more plastic, more soluble and more easily milled. Other types of sulfur-containing compounds, not included in the class of sulfur compounds of this invention, called polymerization modifiers such as dialkyl dixanthogens, diaryl disulfides, tetraalkyl thiuram mono and polysulfides, and mercapto thiazoles, are also known to increase the plasticity and solubility of butadiene polymers and copolymers prepared in their presence. However, these polymerization modifiers generally slow down the speed of the polymerization and, in many cases, inhibit the reaction to such an extent that they cannot be employed unless used simultaneously with strong polymerization catalysts.

The following examples illustrate the practice of the invention when both a polymerization modifier and a sulfur containing compound of this invention are employed in the emulsion during the polymerization.

Example 5

An emulsion containing the following ingredients is prepared:

| | Parts |
|---|---|
| Butadiene | 55 |
| Acrylonitrile | 45 |
| Sodium myristate (2% aqueous solution) | 250 |
| Hydrogen peroxide | .35 |
| Di-isopropyl dixanthogen | 0.60 |
| Thioglycollic acid | .50 |

The emulsion is then agitated at 30° C. for 22 hours whereupon a synthetic latex is obtained which, when coagulated, produces a 96% yield of a rubbery copolymer of butadiene and acrylonitrile. The copolymer is quite plastic, soluble in benzene, and may readily be milled on either a hot or relatively cold mill. Moreover, it was noted that the copolymer acquired considerable tackiness after being milled on a hot mill. When compounded and vulcanized it yielded vulcanizates having tensile strengths of 4500–5800 lbs./sq. in. and ultimate elongations of 420–600%. When this example is repeated in the absence of thioglycollic acid the polymerization requires 45 hours and the polymer obtained is plastic and soluble but it is not readily milled on a hot-mill.

Example 6

The recipe described in Example 5 is again employed except that 0.50 part of 2,2'-dithio-diglycol are employed in place of the thioglycollic acid. A rubbery polymer which is similar to the polymer described in Example 5 is obtained in 95% yield after a polymerization time of 22 hours. Similar results are obtained using d-methionine or cysteine in place of 2,2'-dithiodiglycol.

From these examples it is seen that the sulfur-containing compounds of this invention accelerate polymerizations carried out in the presence of a polymerization modifier and, in addition, improve the milling characteristics of the polymers obtained.

Although all the above examples have been examples of polymerizations employing a fatty acid soap as the emulsifying agent and hydrogen peroxide as the polymerization initiator, it is to be understood that this is merely a preferred procedure and that many other emulsifying agents and initiators may likewise be used.

As emulsifying agents which are useful in the emulsion polymerization of butadiene-1,3 hydrocarbons there may be mentioned fatty acid soaps such as sodium oleate, potassium palmitate and sodium myristate, synthetic saponaceous materials including hymolal sulfates and alkaryl sulfonates such as sodium lauryl sulfate and sodium isopropyl naphthalene sulfonate, and salts of organic bases containing long carbon chains such as trimethyl-cetyl-ammonium methyl sulfate, the hydrochloride of diethylaminoethyloleylamide and the like. The soaps are employed in polymerizations under basic conditions, the salts of organic bases under acid conditions and the synthetic saponaceous materials under acid, alkaline or neutral conditions.

Polymerization initiators which may be employed in the emulsion together with the sulfur-containing compounds of this invention include per-compounds such as hydrogen peroxide, benzoyl peroxide, potassium per-sulfate, sodium perborate, sodium periodate, potassium percarbonate and the like as well as other types of initiators such as diazoaminobenzene, sulfur dioxide, dipotassium diazomethane disulfonate, triphenylmethylazobenzene, sodium cobatinitrite and the like.

The following examples illustrate the practice of the invention with emulsifying agents other than fatty acid soaps and polymerization initiators other than hydrogen peroxide.

Example 7

A mixture of 55 parts of butadiene and 45 parts of acrylonitrile is mixed with 250 c. c. of a 2% aqueous solution of sodium lauryl sulfate, 2 parts of sodium periodate and 0.5 part of beta-mercapto-ethanol. The resulting emulsion is polymerized at 30° C. The polymerization is complete in 90 hours, although in the absence of beta-mercapto ethanol 110 hours are required. When a polymerization modifier such as di-isopropyl dixanthogen is also present in the emulsion during the polymerization a plastic, soluble, easily milled synthetic rubber is obtained but in the absence of beta-mercapto ethanol the di-isopropyl dixanthogen does not appreciably improve the plasticity of the polymers obtained by this type of polymerization.

Example 8

A mixture of 88 parts of butadiene and 72 parts of acrylonitrile is emulsified in 250 parts of a 3% aqueous solution of a sodium alkyl naphthalene sulfonate which is buffered with sodium phosphate to a pH of about 4. After addition of 2 parts of potassium persulfate as a polymerization initiator and 1.5 parts of cysteine, the emulsion is polymerized. The polymerization time is 23 hours at 30° C. In the absence of cysteine the polymerization requires 56 hours at 30° C. The latex obtained by the polymerization of this example may be dried to yield tough, oil resistant synthetic rubber films or it may be coagulated to yield a plastic oil resistant synthetic rubber.

The amount of the sulfur-containing compounds of this invention to be used in the emulsion polymerization of butadiene-1,3 hydrocarbons may be varied over rather wide limits depending upon the particular compound used but, in general, it is preferable that less than 3% of the sulfur compound based on the weight of the monomers be employed. Amounts less than 1% are generally sufficient to effect an increase in the speed of the polymerization but it is often desirable to employ as much as 3% or even more of the sulfur-compound when a large increase in the solubility and plasticity of the polymers is to be effected.

The catalytic effect of the sulfur-containing compounds herein described may further be enhanced by employing a catalytic combination of the sulfur compound with a heavy metal salt or by employing complex compounds containing a heavy metal atom united in complex formation with such sulfur compounds. In this event the time required for the polymerization is decreased far beyond that which could be attained by using a heavy metal salt or the sulfur compound alone. For instance, the polymerization described in Example 2 is 90% completed in only 10½ hours when ferrous ammonium sulfate is employed in combination with beta-mercapto ethanol. Other heavy metal salts such as those of cobalt, nickel, mercury, copper and the like bring about similar reductions in the polymerization time. The use of catalytic combinations of heavy metal compounds with these sulfur-containing compounds is more fully disclosed and claimed in my copending application Serial No. 379,715, filed February 19, 1941.

Other embodiments of this invention wherein other monomer mixtures are polymerized also show that the sulfur-containing compounds of this invention decrease the time required for polymerizations and improve the properties of the polymers obtained. For example, a mixture of 70 parts of butadiene and 30 parts of styrene may be polymerized in aqueous emulsion in the presence of the sulfur-compounds of this invention in a shorter time and more desirable rubbery copolymers are obtained than when such compounds are not present. The same is true when methyl acrylate, methyl methacrylate, isopropenyl ketone, vinylidene chloride and other monomers are used in place of styrene.

Another distinct advantage to be gained by the practice of this invention is that the presence of these sulfur compounds permits polymerizations to occur which would otherwise not take place because of the presence of some inhibitor. Many inhibiting substances are quite difficult to exclude from the polymerization batch since they may be present as impurities in the monomers, in the water employed or in other essential ingredients. For this reason the sulfur-compounds of this invention are often referred to as "detoxifying" agents.

Other methods and procedures known to be useful in connection with the polymerization of butadiene-1,3 hydrocarbon in aqueous emulsion are within the spirit and scope of the invention as defined in the appended claims.

I claim:

1. The method which comprises subjecting a monomeric material comprising butadiene-1,3 hydrocarbon material, as the sole diene material present, to polymerization in aqueous emulsion in the presence of an aliphatic organic compound which contains less than twelve carbon atoms and at least one but not more than two divalent sulfur atoms at least one of which is connected to a carbon atom in an open chain aliphatic radical containing at least one hydrophilic group.

2. The method which comprises subjecting a monomeric mixture comprising a butadiene-1,3 hydrocarbon, as the sole butadiene present, and a monomer which contains a single

group and is copolymerizable therewith in aqueous emulsion, to polymerization in aqueous emulsion in the presence of an aliphatic compound which contains less than twelve carbon atoms and at least one but not more than two divalent sulfur atoms at least one of which is present in a thiol group which is connected to a carbon atom in an open chain aliphatic radical containing at least one hydrophilic group.

3. The method which comprises subjecting a monomeric mixture consisting of butadiene-1,3 and a monomer which contains a single

group and is copolymerizable therewith in aqueous emulsion, to polymerization in aqueous emulsion in the presence of an aliphatic compound containing less than twelve carbon atoms and containing a thiol group connected to an aliphatic radical containing a carboxylic acid group.

4. The method which comprises subjecting a monomeric mixture consisting of butadiene-1,3 and a monomer which contains a single

group and is copolymerizable therewith in aqueous emulsion, to polymerization in aqueous emulsion in the presence of an aliphatic compound containing less than twelve carbon atoms and containing a thiol group connected to an aliphatic radical containing an hydroxy group.

5. The method which comprises subjecting a monomeric material comprising butadiene-1,3 hydrocarbon material, as the sole diene material present, to polymerization in aqueous emulsion in the presence of thioglycollic acid.

6. The method which comprises polymerizing a butadiene-1,3 hydrocarbon in aqueous emulsion in the presence of beta-mercapto ethanol.

7. The method which comprises subjecting a monomeric mixture comprising a butadiene-1,3 hydrocarbon, as the sole butadiene present, and a monomer which contains a single

group and is copolymerizable therewith in aqueous emulsion, to polymerization in aqueous emulsion in the presence of an aliphatic compound which contains less than twelve carbon atoms and two divalent sulfur atoms present in a disulfide group which is linked by each of its disconnected valences to a carbon atom in an aliphatic radical containing at least one hydrophilic group.

8. The method which comprises subjecting a monomeric mixture consisting of butadiene-1,3 and a monomer which contains a single

group and is copolymerizable therewith in aqueous emulsion, to polymerization in aqueous emulsion in the presence of an aliphatic compound which contains less than twelve carbon atoms and two divalent sulfur atoms present in a disulfide group which is linked by each of its disconnected valences to a carbon atom in an aliphatic radical containing at least one carboxylic acid group.

9. The method which comprises subjecting a monomeric mixture consisting of butadiene-1,3 and a monomer which contains a single

group and is copolymerizable therewith in aqueous emulsion, to polymerization in aqueous emulsion in the presence of cystine.

10. The method which comprises polymerizing in aqueous emulsion a mixture of a butadiene-1,3 hydrocarbon as the sole butadiene present, and a compound which contains a single

group and is copolymerizable therewith in aqueous emulsion in the presence of an aliphatic organic compound which contains less than twelve carbon atoms and at least one but not more than two divalent sulfur atoms at least one of which is connected to a carbon atom in an open chain aliphatic radical containing a hydrophilic group.

11. The method which comprises polymerizing a mixture of butadiene-1,3 and acrylonitrile in an aqueous emulsion in the presence of thioglycollic acid.

12. The method which comprises polymerizing a mixture of butadiene-1,3 and acrylonitrile in an aqueous emulsion in the presence of beta-mercapto ethanol.

13. The method which comprises polymerizing a mixture of butadiene-1,3 and acrylonitrile in an aqueous emulsion in the presence of cystine.

WILLIAM D. STEWART

Certificate of Correction

Patent No. 2,380,905.

July 31, 1945.

WILLIAM D. STEWART

It is hereby certified that errors appear in the printed specification of the above numbered patent requiring correction as follows: Page 2, second column, line 61, for "copolymerizeid" read *copolymerized*; line 69, for "copolymerizaition" read *copolymerization*; page 3, first column, line 43, for "4" read *45*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.*